United States Patent [19]

Knaus et al.

[11] 4,190,381
[45] Feb. 26, 1980

[54] WAVE-COMPLIANT, BOTTOM TENSION BOOM

[75] Inventors: Ernest Knaus, Akron; Dale C. Goubeaux, Tallmadge; Anthony L. Dunne, Hudson, all of Ohio; George A. Lucas, Rockmart, Ga.; Jere A. Noerager, Houston, Tex.

[73] Assignee: Goodyear Aerospace Corporation, Akron, Ohio

[21] Appl. No.: 932,051

[22] Filed: Aug. 8, 1978

[51] Int. Cl.² .............................................. E02B 15/04
[52] U.S. Cl. ........................................ 405/72; 405/63
[58] Field of Search ................ 61/1 F, 5; 405/60, 63, 405/66, 72

[56] References Cited

U.S. PATENT DOCUMENTS

| | | | |
|---|---|---|---|
| 3,751,925 | 8/1973 | Thurman | 61/1 F |
| 3,852,965 | 12/1974 | Rudd | 61/1 F |
| 3,886,750 | 6/1975 | Ayers et al. | 61/1 F |

*Primary Examiner*—David H. Corbin
*Attorney, Agent, or Firm*—P. E. Milliken; D. J. Hudak; E. W. Oldham

[57] ABSTRACT

A bottom tension boom for collecting floating material, such as an oil spill upon a body of water, has a barrier containing an upper or freeboard portion, a lower or skirt portion which is submerged in and extends downwardly into said body of water, and pleats or slack portions which extend generally vertically across the barrier. A plurality of flotation elements is attached to the freeboard portion of the barrier and thereby supports the barrier as a whole upon the water. A lattice containing a plurality of strands made from an extensible material is attached to the skirt and extends downwardly therefrom. The lower portion of the lattice is connected to a bottom tension line which is shorter in length than the corresponding portion of the barrier. The boom is towed by tow lines connected solely to the bottom tension line and effects a backward skirt inclination with respect to the position of the bottom tension line. The extensible strands of the lattice are positioned at a non-vertical angle, generally at a 10° to a 40° angle, with respect to the bottom tension line and the skirt to produce a geometric lattice which amplifies the strand material extensibly and acts as a soft spring so that excellent wave compliance is obtained in that the bottom tension tow line remains relatively stationary, while the flotation elements move freely up and down, backward or forward, and to and fro (laterally) with the waves or water surface.

18 Claims, 4 Drawing Figures

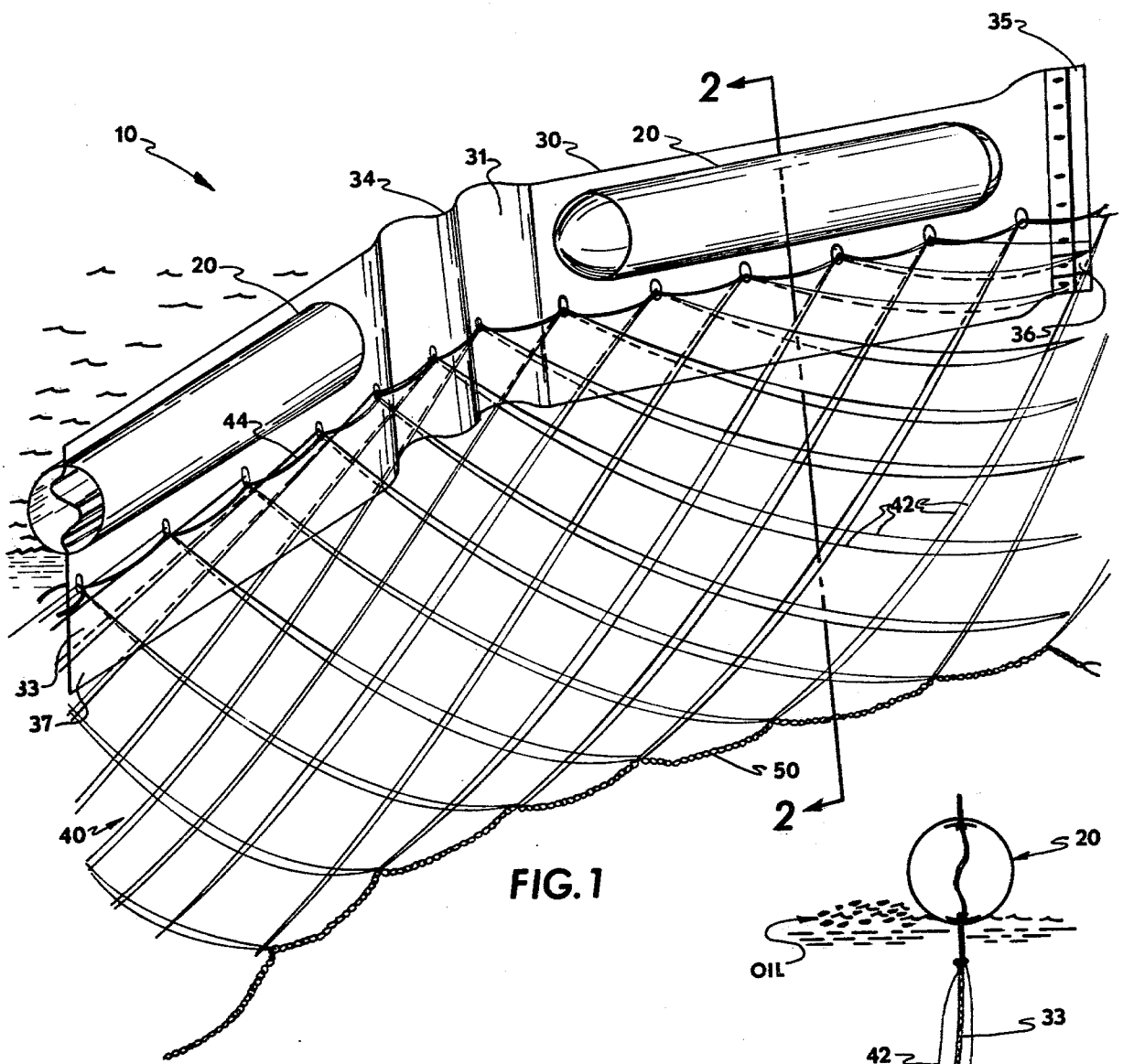
FIG. 1
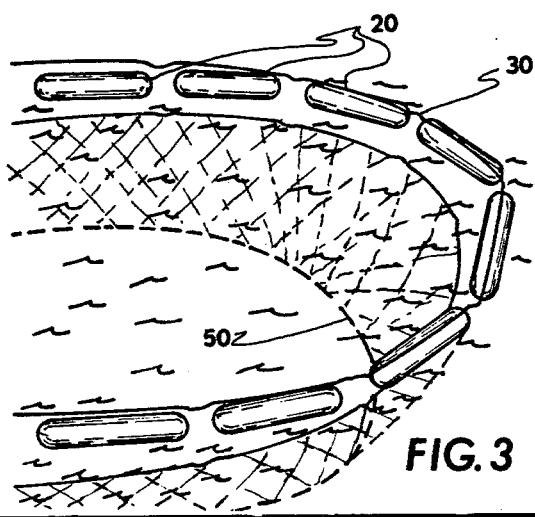
FIG. 2
FIG. 3

WAVE-COMPLIANT, BOTTOM TENSION BOOM

BACKGROUND OF THE INVENTION

The present invention relates to a bottom tension boom having excellent wave compliance with regard to any individual flotation unit in that its individual flotation members freely move with the wave, thereby minimizing relative velocity between the water in the wave and the flotation member. Thus, a compliant boom is capable of extensive movement, with regard to any upward or downward motion, any forward or backward motion, and any lateral motion caused by waves.

Heretofore, booms, such as those towed by boats and employed for the containment of floating matter such as oil upon a sea, have contained therein a top and, sometimes, a bottom tension member. The top tension cable is generally connected to a flotation member which in turn is generally connected to an impervious skirt. An open-strap system extends downwardly from and, if a bottom tension member is utilized, connects the skirt with said bottom member. All components of such an apparatus are of the same length. Naturally, with the top tension member being under tension, wave compliance is very poor in that the individual flotation members are not freely permitted to bob up or down, laterally, or backward and forward.

One such device is set forth in U.S. Pat. No. 3,852,965 which has a top cable 15, a flotation member 20, a pendant skirt 25, an open-strap network 26, and a bottom tension cable 16. Moreover, straps 26 are attached solely in a vertical position, and such structure further limits any wave compliance since the straps are relatively non-extendible.

A bottom tension boom is discussed in Proceedings of Joint Conference on Prevention and Control of Oil Spills, Mar. 13–15, 1973, Washington, D.C. However, such a boom is still unsuitable to produce wave compliance due largely to the utilization of a lattice having vertical straps. That is, the vertical nature of the lattice prevents upward or downward bobbing of the individual buoyancy units. Moreover, the length of the skirt is equal to the length of the bottom tension line which is attached, thus abating any good wave compliance of the buoyancy units.

Other prior art materials relating to flotation booms which have poor wave compliance are U.S. Pat. No. 2,693,161 to Stubbs, U.S. Pat. No. 3,648,463 to Ayres, U.S. Pat. No. 3,740,995 to Fossberg, U.S. Pat. No. 3,903,701 to Gauch, Canadian Pat. No. 906,772 to Fossberg, and French Pat. No. 2,009,655 to Henke.

SUMMARY OF THE INVENTION

It is, therefore, an object of the present invention to provide a bottom tension boom having excellent wave compliance.

It is another object of the present invention to provide an excellent wave-compliant, bottom tension boom, as above, wherein flotation units are attached to a barrier having a submerged skirt portion, and a lattice connects said skirt to said bottom tension cable.

It is a further object of the present invention to provide an excellent wave-compliant, bottom tension boom, as above, wherein said lattice comprises extensible strands orientated in a non-vertical direction.

It is an additional object of the present invention to provide an excellent wave-compliant, bottom tension boom, as above, wherein said lattice has a geometric configuration such that a soft spring effect is achieved upon the movement of any particular flotation unit.

It is still another object of the present invention to provide an excellent wave-compliant, bottom tension boom, as above, wherein said lattice strands are at an inclination of from about 10° to about 40° with respect to the horizontal and, optimally, at about a 20° angle.

It is a still further object of the present invention to provide an excellent wave-compliant, bottom tension boom, as above, wherein said bottom tension line remains relatively stationary while any particular flotation unit freely complies with a wave.

It is still an additional object of the present invention to provide an excellent wave-compliant, bottom tension boom, as above, wherein said barrier has a longer length than a corresponding portion of an attached bottom tension line.

These and other objects of the present invention will become apparent by reference to the preferred embodiments which set forth in detail the best mode of the invention.

Generally, a bottom tension boom for wave compliance, comprises: a plurality of flotation elements residing upon a body of water; a contaminate impervious barrier, said barrier having an upper freeboard portion and a lower skirt portion, said flotation elements attached to said freeboard portion and causing said flotation elements and said freeboard portion to largely reside upon the surface of said water, said skirt portion largely submerged in and extending downwardly into said body of water; a lattice, said lattice containing a plurality of extensible strands, said strands attached to said skirt and extending downwardly therefrom and having a bottom portion; a bottom tension line, said bottom tension line attached to said bottom portion of said lattice, and said lattice strands attached at an inclination angle with respect to the horizontal of from about 10° to about 40° to said skirt and said bottom tension line when said skirt and said bottom tension line are in a horizontal position so that wave compliance of said flotation elements with said body of water is achieved while said bottom tension line remains relatively motionless. Moreover, said barrier has a longer length than a corresponding portion of said bottom tension line.

Additionally, a bottom tension boom for wave compliance, comprises: a plurality of floating elements residing upon a body of water; a contaminate impervious barrier, said barrier having an upper freeboard portion and a lower skirt portion, said flotation elements attached to said freeboard portion and causing said flotation elements and said freeboard portion to largely reside upon the surface of said water, said skirt portion largely submerged in and extending downwardly into said body of water; a lattice of extensible strands, said lattice attached to said skirt, said lattice having a geometric configuration wherein said strands exist from about a 10° to about a 40° angle with regard to the horizontal so that said lattice acts as a soft spring when a portion of said barrier is subjected to a disturbing force; a bottom tension line, said bottom tension line located at the bottom portion of said lattice and attached thereto; and said lattice geometric configuration achieving wave compliance between said barrier and said body of water so that said bottom tension line is maintained in a relatively motionless position. Moreover, said barrier has a longer length than a corresponding portion of said bottom tension line.

BRIEF DESCRIPTION OF THE DRAWINGS

FIG. 1 is a perspective view of a bottom tension boom according to the present invention;

FIG. 2 is a side-sectional view taken on lines 2—2 of FIG. 1;

FIG. 3 is a top plan view showing the location of the fully extended skirt in relationship to the bottom tension cable.

DETAILED DESCRIPTION OF THE PREFERRED EMBODIMENTS

Figure 4:
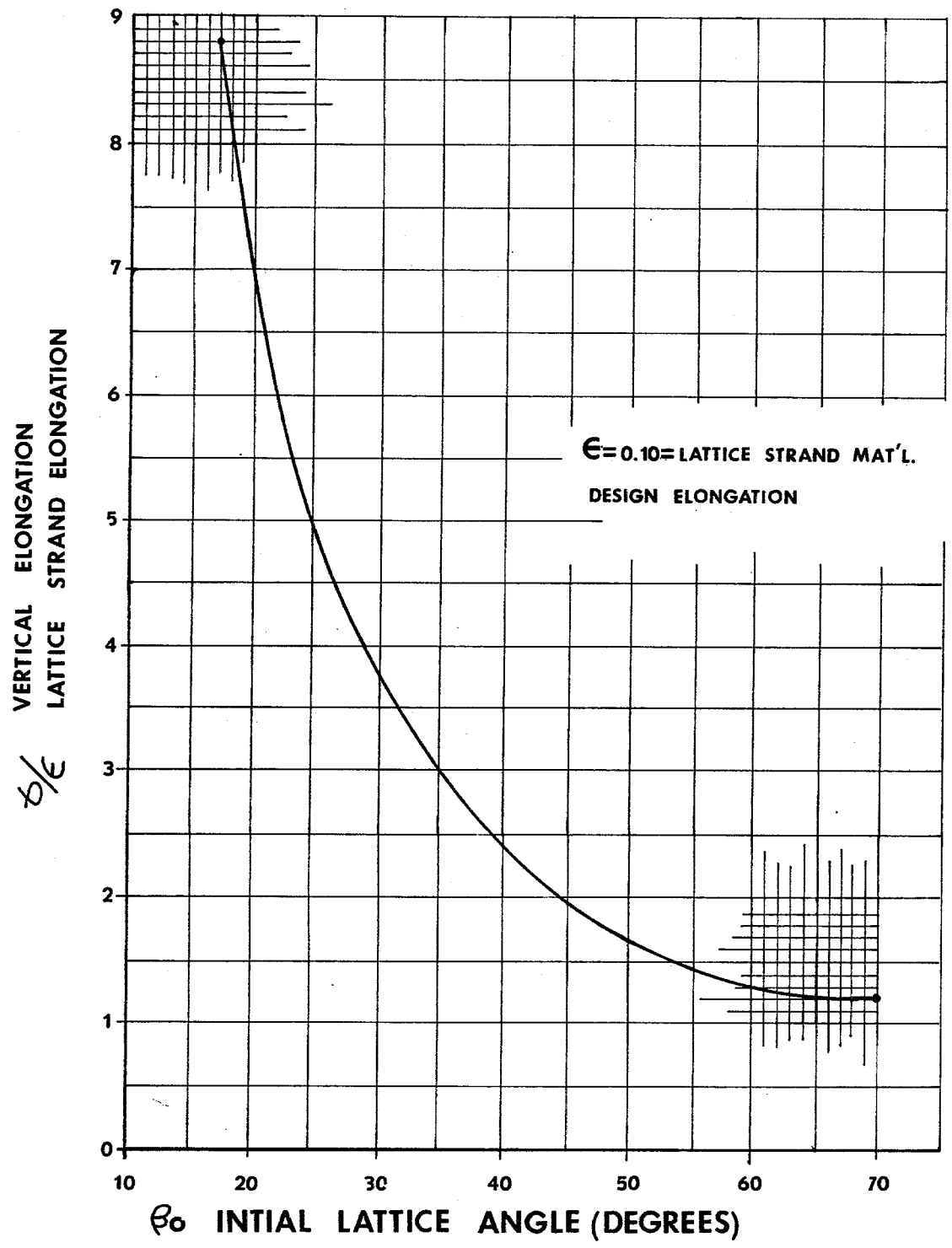
FIG. 4 is a graph showing how the initial lattice angle multiplies the elongation of the lattice material to give a large overall elongation of the lattice.

A bottom tension boom, having excellent wave compliance according to the present invention and which is capable of retaining floating matter such as an oil spill upon a body of water, is generally indicated by the numeral 10. Boom 10 comprises a plurality of flotation units 20, a barrier 30 having an upper or freeboard portion 31 and a lower submerged skirt portion 33, an open lattice unit, generally indicated by the number 40, which lattice unit depends and extends downwardly from said skirt 33, and a bottom tension line 50 to which the bottom portion of said lattice is attached.

Flotation units 20, desirably, exist in the form of an elongated horizontal member such as a cylinder and are made of fabrics having good weather, abrasion, and puncture resistance along with a high tear and tensile strength. Generally, rubberized fabrics may be utilized such as nylon or polyester. Although any conventional flotation unit may be attached to barrier freeboard portion 31 in any conventional manner, preferably, the flotation unit is integral with freeboard portion 31 such that it is a part thereof. Moreover, as shown in FIGS. 1 and 2, a semi-cylindrical flotation unit is preferred. Such a flotation unit is taught in U.S. Pat. No. 3,849,989, which is hereby fully incorporated by reference, and is made by extending barrier freeboard portion 31 through the middle of the flotation unit. This creates two sections so that loss of air pressure, due to a puncture or tear on one side of the flotation unit, will not cause the entire flotation unit 20 to collapse.

For ease of storage, assembly, and the like, boom 10 is comprised of a plurality of barrier segments of any desirable length, in any conventional manner, to form a continuous barrier of any desired finite length. Similarly, lattice 40 as well as bottom tow line 50 exists in segments and may be attached to each other in any conventional manner. For example, the end connector 35, which may be made of steel, can be utilized to join sections of the boom as by bolting it to a mating end connector of any adjacent boom segment (not shown). Moreover, the metal reinforcement in the end connector 35 is segmented at 36 below the water line such that upon wave compliant motion, skirt 33 attached to the end connector can freely bend. The actual attachment of the end connector to the barrier may be in any conventional manner such as through the fasteners such as a nut and bolt or through bonding with the barrier fabric.

Preferably, barrier 30 is impervious with respect to the contaminate. However, due to the availability of various materials, the cost of such materials, and the like, barrier 30 is often impervious to water as well. Thus, the barrier may be made of the same material as the flotation unit, that is a rubber-coated nylon fabric, and thus exhibits the same good physical properties including virtually corrosion-free resistance when deployed in a saline environment such as an ocean.

It is critical to the present invention that, in order to obtain wave compliance, the arc length of the barrier 30 be greater than the arc length of corresponding bottom tension line 50 which carries all of the boom load. Desirably, the barrier length, depending upon the wave height, is from about 2 to about 10 percent longer than the corresponding bottom tension line and, preferably, is approximately 5.5 percent longer. That is, should bottom tension line 50 exist in segments of 100 feet, barrier 30, depending upon the expected wave-height usage, would have a length of from about 102 feet to about 110 feet. The additional length is incorporated into the barrier between individual flotation units 20, as slack 34. Due to the weight placed upon barrier 30 by lattice unit 40 and, especially, by the bottom tension line, the slack will generally be exhibited in actual use as folds or accordion-like pleats, as shown in FIG. 1. Not only does the greater length of barrier 30 permit wave compliance generally with regard to movement of individual flotation units 20 in a back and forth, up and down, or in a lateral direction, either individually or in concert with other floats, but also imparts a generally backward inclination to the lower portion of the barrier with respect to the bottom tension line. Thus, when the boom is deployed and towed, it takes the shape of a catenary as shown in FIG. 3. The dotted line represents the submerged bottom tension line 50, whereas the solid lines represent the barrier 30 and flotation units 20 which have been extended outwardly away from the direction of tow.

Considering lattice unit 40, it can be attached to barrier 30 at any location so long as the lattice readily effects wave compliance. Such locations generally are any position below flotation units 20, that is, at any location on skirt 33. Moreover, when the boom is deployed in a shallow body of water, it is desirable that the lattice be attached to barrier 30 at a point on skirt 33 just below the flotation units, as shown in FIG. 1. Such an expedient raises bottom tension line 50 as well as the entire lattice a distance upward corresponding to the distance between bottom edge 37 of the skirt and a point just below the flotation units. Moreover, when lattice 40 is attached to skirt 33 at any point other than the bottom portion of the skirt, a dual lattice is desirable in that individual lattice strands 42 will exist on either side of the bottom portion of the skirt and, thus, permit non-directional deployment. That is, regardless of the direction of the waves, the current, or the direction of tow, either side of skirt 30 serves to act as an impervious barrier with regard to any flotation matter such as oil which is desired to be contained and collected. Moreover, such an embodiment readily can handle changes in direction of the skirt extension, for example, a 180° reversal of tow direction, a change in tide direction, or the like. This aspect is highly desirable when various floating matter, such as oil spills, is desired to be contained and collected in shallow bodies of water as in the vicinity of a shore line, wherein large ecological damage could otherwise occur.

Individual strands 42 of lattice 40 desirably have relatively good extensibility, good fatigue resistance, good abrasion resistance, a low hysteresis and do not suffer from the adverse affects of the saline environment. Such a suitable material is a polyvinyl chloride-coated nylon. Moreover, further extensibility can be obtained by twisting individual strands 42 so that they contain a plurality of revolutions between the skirt attachment and the tow line attachment. Generally, the strand extension depends upon the material, and for the preferred strand is approximately a 10 to 20 percent elongation.

It is another critical feature of the present invention, in order to permit excellent wave compliance, that individual strands 42 of the lattice are attached to skirt 30 as well as tow line 50 at a non-vertical angle, that is, at an angle other than vertical. In other words, it is essential that strands 42 form some geometric configuration or pattern between the skirt and tow line such that the result is a soft spring effect which thereby permits wave compliance. A preferred configuration is a diamond or criss-cross shaped lattice as shown in FIG. 1. Regardless of the exact geometric configuration, desirably, the individual strands 42 have from about a 10° to about a 40° angle of incidence with either skirt 30 or tow line 50 when the skirt or tow line are in a horizontal position and, preferably, from about 15° to about a 25° angle. An optimum angle is approximately 20°.

The effect of the non-vertical lattice inclination is shown in FIG. 4 wherein $\beta_o$ is the initial lattice angle of incidence with regard to the horizontal and $\epsilon$ is the lattice elongation for a specific strand material such as nylon. The vertical elongation, that is, the entire upward or vertical movement of the lattice is denoted by $\gamma$. Thus, FIG. 4 indicates the various vertical elongations or soft spring effects of the lattice when the initial lattice inclination angle is $\beta_o$ and the lattice material design elongation factor is 0.1.

The importance of the non-vertical strand attachment angle is that the displacement of any particular flotation unit, either forward or backward, laterally, and upward or downward, is readily permitted by such lattice layout. Thus, any particular float member 20 will freely ride upon the surface of the water. Hence, a portion of the skirt will remain beneath the surface of the water, with the float and freeboard portions remaining above the water surface. Moreover, the structure of the present invention further permits independent action of individual flotation units 20 with regard to one another, through the operation of the lattice as well as through the existence of slack portion 34 between the individual units, such that there is essentially no transfer of force or load from one float to the adjacent float in any direction. Thus, the contaminate such as oil upon the surface of the water is constantly confronted with impervious barrier 30.

In order to facilitate accurate construction, location, and attachment of the lattice to the barrier, joinder ropes 44 exist along the top of the lattice unit, as shown in FIG. 1.

Bottom tension line 50, as previously noted, carries all the tension or load of the entire boom and is connected to other bottom tension line segments and their attached lattice and barrier segments to form a boom of any desired length. The overall bottom tension line, thus formed, can be connected in any conventional manner to a tow cable (not shown) which is usually attached to a boat or ship. The individual lattice strands 42 can be attached to bottom tension line 50 in any conventional manner such as the bottom or furthermost downward strand being connected to a thimble (not shown) with the thimble connected to a link (not shown). The link in turn, is connected to the bottom tension line.

The requirements for selection of a suitable bottom tension line is that it be strong enough to enable it to tow a desired length of boom at a specific speed. Moreover, it should be of a sufficient weight in order to keep the lattice as well as the skirt at a reasonable upright angle at a desired tow speed. Naturally, since the lattice presents a relatively open and unobstructed flow channel, ocean current, tides and the like can freely move through this portion of the bottom tension boom 10.

The boom of the present invention, naturally, may be utilized to collect and retain any material which floats upon a liquid.

By way of example, a tension boom for a particular application can have the following dimensions:
Overall length of flotation unit—100 inches
Overall height of flotation unit—24 inches
Overall impervious barrier height—62 inches
Freeboard extension above float—2 inches
Overall skirt depth—36 inches
Point of lattice attachment to skirt (above bottom of skirt)—36 inches
Nominal design bottom tension line depth (beneath bottom of skirt)—32 inches
Angle of incidence of strand attachment (to horizontal)—20°
Strand thickness, 3/16 inch nylon rope
Skirt joinder line, ⅜ inch nylon rope
Bottom Tension line, ¾ inch galvanized steel chain
Overall distance between extended barrier repeat units—118 inches
Bottom tension line length—112 inches Naturally, depending upon the anticipated wave environment, the overall barrier height, the skirt depth, the lattice depth, the bottom tension line length, as well as the other parameters can be scaled upwardly or downwardly. The particular embodiment set forth above by way of example, was designed to operate in currents of about one knot and still achieve excellent wave compliance, with significant wave heights (crest-to-trough) of up to about eight feet.

While having described the invention in accordance with the patent statutes, the invention is to be measured by the scope of the attached claims.

What is claimed is:
1. A bottom tension boom for wave compliance, comprising:
a plurality of flotation elements residing upon a body of water;
a contaminate impervious barrier, said barrier having an upper freeboard portion and a lower skirt portion, said flotation elements attached to said freeboard portion and causing said flotation elements and said freeboard portion to largely reside upon the surface of said water, said skirt portion largely submerged in and extending downwardly into said body of water;
a lattice, said lattice containing a plurality of extensible strands, said strands attached to said skirt and extending downwardly therefrom and having a bottom portion;
a single tension line means for carrying the entire load on said boom, said single tension line means being a bottom tension line, said bottom tension line attached to said bottom portion of said lattice,
said lattice strands attached to said skirt and said bottom tension line in such a manner to form a criss-crossed lattice, said criss-crossed lattice strands attached at an inclination angle with respect to the horizontal of from about 10° to about 40° to said skirt and said bottom tension line when said skirt and said bottom tension line are in a horizontal position so that wave compliance of said flotation elements with said body of water is achieved while said bottom tension line remains relatively motionless, and said barrier being longer than the corresponding length of said attached bottom tension line, said barrier having slack portions therein, said slack portions located between adjacent flotation elements.

2. A bottom tension boom for wave compliance, according to claim 1, wherein said barrier is from about 2 percent to about 10 percent longer than said corresponding portion of said bottom tension line.

3. A bottom tension boom for wave compliance, according to claim 2, wherein said bottom tension line is attached to a tow cable.

4. A bottom tension boom for wave compliance according to claim 3, wherein said flotation element is integral with said skirt.

5. A bottom tension boom for wave compliance according to claim 4, wherein said lattice strands and said barrier slack portions permit wave compliance of said individual flotation elements by permitting free movement of said flotation elements in an up and down, backward or forward, or lateral direction.

6. A bottom tension boom for wave compliance, according to claim 5, wherein said lattice strand inclination ranges from about 15° to about 30° and said entire barrier is water impervious.

7. A bottom tension boom for wave compliance, according to claim 6, wherein said lattice strand inclination is approximately 20° and wherein said barrier is approximately 5.5 percent longer than said corresponding portion of said bottom tension line.

8. A bottom tension boom for wave compliance, according to claim 5, wherein said lattice is attached to the bottom portion of said skirt.

9. A bottom tension boom for wave compliance, according to claim 5, wherein said lattice is a dual lattice and wherein said lattice is attached to opposite sides of said skirt at a point below said flotation elements.

10. A bottom tension boom for wave compliance, comprising:

a plurality of floating elements residing upon a body of water;

a contaminate impervious barrier, said barrier having an upper freeboard portion and a lower skirt portion, said flotation elements attached to said freeboard portion and causing said flotation elements and said freeboard portion to largely reside upon the surface of said water, said skirt portion largely sumberged in and extending downwardly into said body of water;

a lattice of extensible strands, said lattice attached to said skirt, said lattice strands forming a criss-cross geometric configuration wherein said strands exist from about a 10° to about a 40° angle with regard to the horizontal so that said lattice acts as a soft spring when a portion of said barrier is subjected to a disturbing force;

a single tension line means for carrying the entire load on said boom, said single tension line means being a bottom tension line, said bottom tension line located at the bottom portion of said lattice and attached thereto;

said barrier being longer than the corresponding length of said attached bottom tension line, said barrier having slack portions therein, said slack portions located between adjacent flotation elements; and said lattice geometric configuration and said barrier slack portions achieving wave compliance between said barrier and said body of water so that said bottom tension line is maintained in a relatively motionless position.

11. A bottom tension boom for wave compliance, according to claim 10, wherein said barrier is from about 2 percent to about 10 percent longer than said corresponding portion of said bottom tension line.

12. A bottom tension boom for wave compliance, according to claim 11, wherein said bottom tension line is attached to a tow cable.

13. A bottom tension boom for wave compliance, according to claim 12, wherein said flotation element is integral with said skirt.

14. A bottom tension boom for wave compliance, according to claim 13, wherein said lattice strands and said barrier slack portions permit wave compliance of said individual flotation elements by allowing each flotation element to freely move in an up and down, backward or forward, or lateral direction.

15. A bottom tension boom for wave compliance, according to claim 14, wherein said lattice strand inclination ranges from about 15° to about 30° and said entire barrier is water impervious.

16. A bottom tension boom for wave compliance, according to claim 15, wherein said lattice strand inclination is approximately 20° and wherein said barrier is approximately 5.5 percent longer than said corresponding portion of said bottom tension line.

17. A bottom tension boom for wave compliance, according to claim 13, wherein said lattice is attached to the bottom portion of said skirt.

18. A bottom tension boom for wave compliance according to claim 13, wherein said lattice is a dual lattice and wherein said lattice is attached to opposite sides of said skirt at a point below said flotation elements.

* * * * *